(12) United States Patent
Whitaker et al.

(10) Patent No.: US 9,228,626 B2
(45) Date of Patent: Jan. 5, 2016

(54) TUBULAR TORSION BAR

(71) Applicants: Todd Michael Whitaker, Boulder, CO (US); Adam Cuthbert Pauluhn, Niwot, CO (US); Mark A. Beran, Niwot, CO (US)

(72) Inventors: Todd Michael Whitaker, Boulder, CO (US); Adam Cuthbert Pauluhn, Niwot, CO (US); Mark A. Beran, Niwot, CO (US)

(*) Notice: Subject to any disclaimer, the term of this patent is extended or adjusted under 35 U.S.C. 154(b) by 179 days.

(21) Appl. No.: 13/941,799

(22) Filed: Jul. 15, 2013

(65) Prior Publication Data

US 2013/0300043 A1 Nov. 14, 2013

Related U.S. Application Data

(63) Continuation-in-part of application No. 12/955,039, filed on Nov. 29, 2010, now Pat. No. 8,505,888.

(51) Int. Cl.
*F16F 1/16* (2006.01)
(52) U.S. Cl.
CPC ........................................ *F16F 1/16* (2013.01)
(58) Field of Classification Search
CPC ........................................................ F16F 1/16

USPC ....................... 267/154, 273, 276, 280, 141.1
See application file for complete search history.

(56) References Cited

U.S. PATENT DOCUMENTS

| 3,905,208 | A | * | 9/1975 | Oyama et al. | ................... | 464/88 |
| 4,491,342 | A | * | 1/1985 | Aubry | ..................... | 280/124.13 |
| 4,659,069 | A | * | 4/1987 | Odobasic | ..................... | 267/280 |
| 2009/0134591 | A1 | * | 5/2009 | Chen et al. | .............. | 280/87.042 |

* cited by examiner

*Primary Examiner* — Melanie Torres Williams
(74) *Attorney, Agent, or Firm* — Robert A. Parsons; Michael W. Goltry; Parsons & Goltry

(57) ABSTRACT

A tubular torsion bar including an elongated inner tube of flexible material having a proximal end and a distal end, an elongated outer tube of flexible material having a proximal end and a distal end, a cylindrically shaped joiner bushing fixedly attached to and positioned partially between the distal end of the inner tube and the distal end of the outer tube with the inner tube and outer tube positioned in coaxial and substantially coextensive concentric nesting positions, external apparatus mounting the joiner bushing to maintain axial alignment of the distal and proximal ends of the inner tube and the outer tube and for limited rotational movement, and a mounting and output system fixedly attached to the proximal ends of the inner tube and the outer tube.

18 Claims, 10 Drawing Sheets

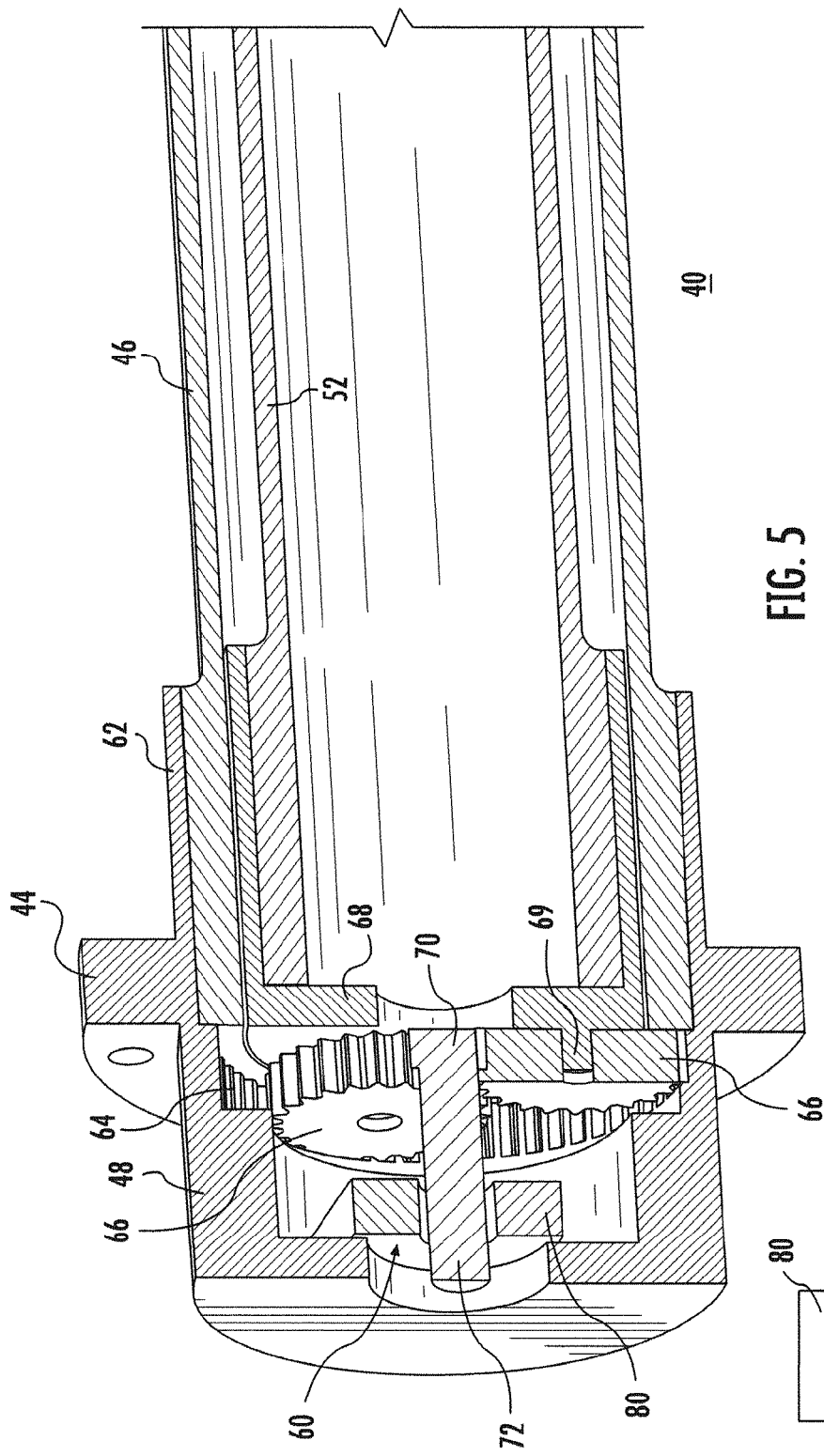
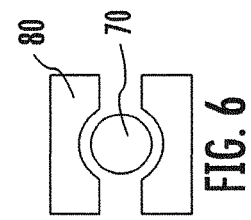

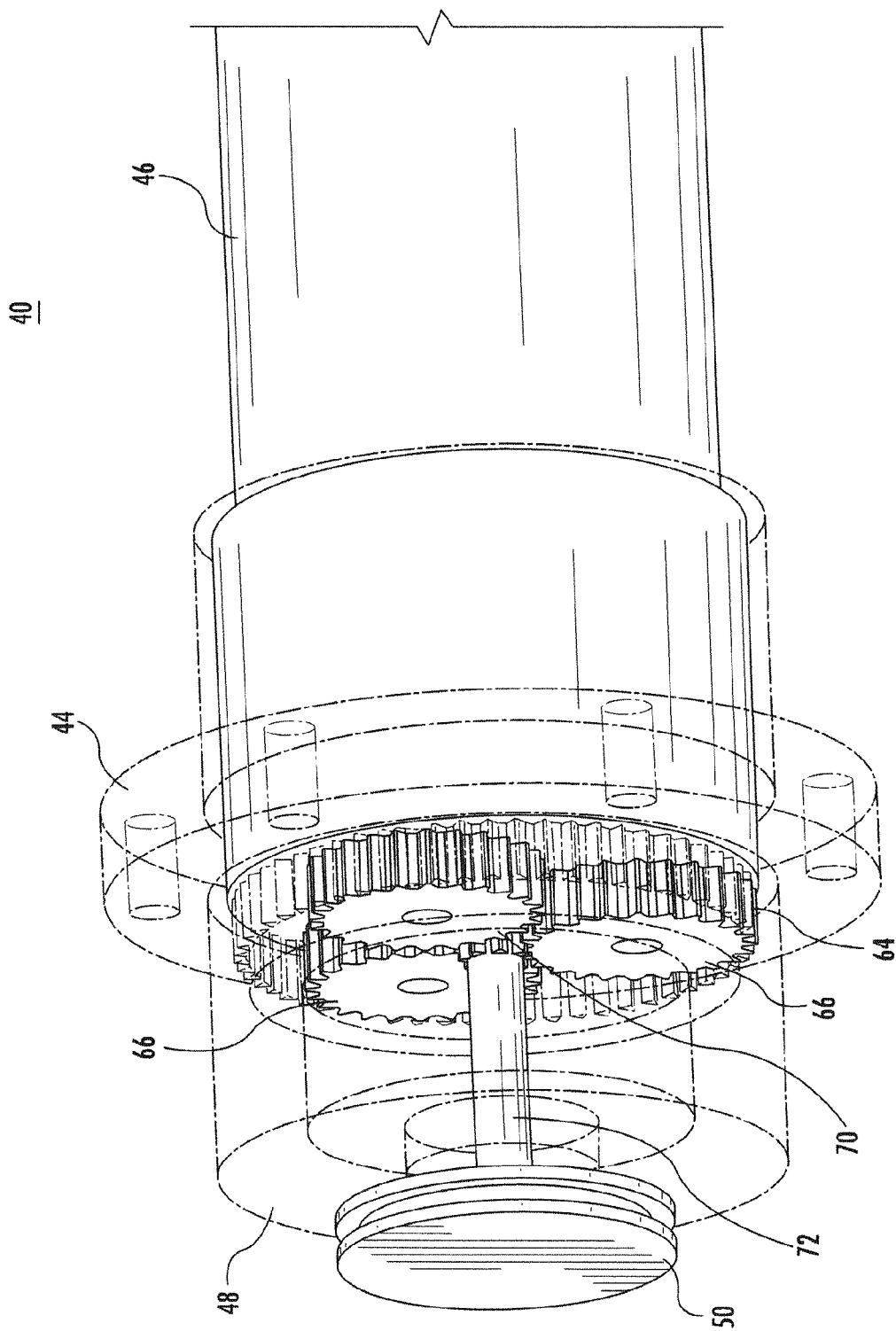

Section A-A

Section B-B

TUBULAR TORSION BAR

CROSS-REFERENCE TO RELATED APPLICATIONS

This is a continuation-in-part of copending U.S. patent application Ser. No. 12/955,039, entitled "TUBULAR TORSION BAR", filed 29 Nov. 2010.

FIELD OF THE INVENTION

This invention generally relates to torsion bar type springs and more particularly to the mounting, coupling, and materials of the torsion bar.

BACKGROUND OF THE INVENTION

Many types of springs are available for energy storage. For example, coil springs store energy by compressing a helically wound wire. Other types of conventional springs include torsion springs and torsion bars. All spring systems can be characterized by how much energy can be stored per unit volume. Another property by which springs can be characterized is by how much energy can be stored per unit mass (or weight). The performance of devices which utilize springs for energy storage can be improved by increasing the amount of energy which can be stored per unit volume and per unit mass.

A somewhat different type of torsional spring is disclosed in U.S. Pat. No. 5,020,783, entitled "Torsional Spring", and issued Jun. 4, 1991. This patent discloses a torsional spring formed by providing an inner tube that is continuously turned back at a distal end to produce an outer coaxial tube. The tube is made of glass-fiber reinforced plastic. The free end of the inner portion of the tube is connected to one component of a device requiring some spring action and the free end of the outer portion of the tube is connected to a second component of the device. The two components of the device can then be rotated relative to each other and the tube provides some spring action. A major problem with this type of torsional spring is the difficulty in manufacturing it. A second drawback is the fact that the inner and outer portions of the tube must be a continuous formation of the same material. A further drawback is the fact that the relative rotation between the two components of the device is strictly limited to the amount of torsion or twisting that can be allowed between the inner and outer portions of the tube.

It would be highly advantageous, therefore, to remedy the foregoing and other deficiencies inherent in the prior art.

Accordingly, it is an object of the present invention to provide a new and improved tubular torsion bar.

It is another object of the present invention to provide a new and improved tubular torsion bar with improved energy storage potential per unit mass and volume.

It is another object of the present invention to provide a new and improved tubular torsion bar that is simpler to manufacture and use.

SUMMARY OF THE INVENTION

Briefly, to achieve the desired objects of the instant invention in accordance with a preferred embodiment thereof, provided is a tubular torsion bar including an elongated inner tube of flexible material having a proximal end and a distal end, an elongated outer tube of flexible material having a proximal end and a distal end, a cylindrically shaped joiner bushing fixedly attached to and positioned partially between the distal end of the inner tube and the distal end of the outer tube with the inner tube and outer tube positioned in coaxial and substantially coextensive concentric nesting positions, external apparatus mounting the joiner bushing to maintain axial alignment of the distal and proximal ends of the inner tube and the outer tube and for limited rotational movement, and a mounting and output system fixedly attached to the proximal ends of the inner tube and the outer tube.

The desired objects of the instant invention are further achieved in accordance with a specific embodiment thereof wherein a tubular torsion bar includes an elongated inner tube of flexible material having a proximal end and a distal end and an elongated outer tube of flexible material having a proximal end and a distal end. A cylindrically shaped joiner bushing is fixedly attached to and positioned partially between the distal end of the inner tube and the distal end of the outer tube with the inner tube and outer tube positioned in coaxial and substantially coextensive concentric nesting positions. The joiner bushing includes a distal end power take-off for extracting a portion of energy stored in the tubular torsion bar. External apparatus mount the joiner bushing to maintain axial alignment of the distal and proximal ends of the inner tube and the outer tube and for limited rotational movement. A mounting and output system is fixedly attached to the proximal ends of the inner tube and the outer tube. The mounting and output system includes mounting apparatus affixed to the outer tube and output apparatus affixed to the inner tube with an annular element positioned between the mounting apparatus and the output apparatus to rotatably position the inner tube and the outer tube in coaxial and substantially coextensive concentric nesting positions.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 5 is an enlarged cross-sectional view in perspective of a portion of the tubular torsion bar and the improved mounting and output system of FIG. 2;

FIG. 6 is a simplified end view of a portion of the output system of FIG. 5;

FIG. 7 is a view similar to FIG. 3 illustrating in phantom the position of various components of the improved mounting and output system;

DETAILED DESCRIPTION OF THE DRAWINGS

Figure 1:
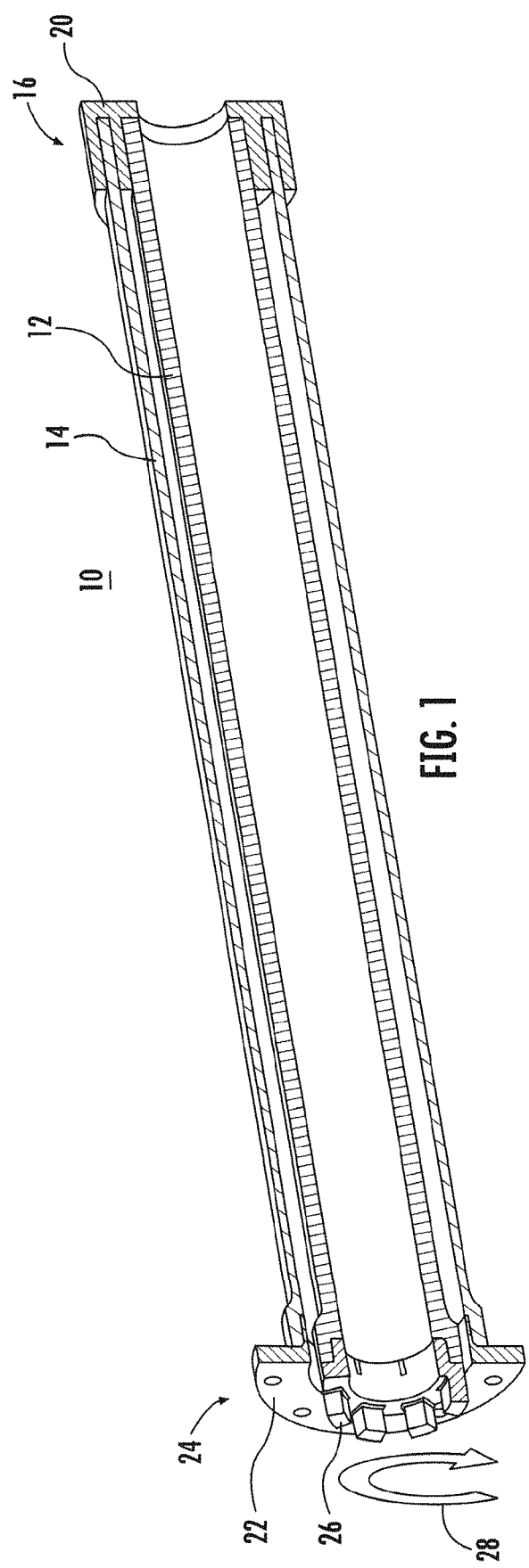
FIG. 1 is a cross-sectional view in perspective of a tubular torsion bar in accordance with the present invention.

Turning now to FIG. 1, a tubular torsion bar 10, in accordance with the present invention, is illustrated. Torsion bar 10 includes an inner tube 12 and an axially aligned outer tube 14 fixedly joined at a distal end 16 by a joiner bushing 20. Mounting apparatus, which in this example includes a mounting ferrule 22, is attached to a proximate end 24 of outer tube 14 for fixedly attaching tubular torsion bar 10 to a component of a device (not shown) requiring some spring action. Output apparatus, which in this example includes an output ferrule 26, is attached to the proximate end of inner tube 12 and is designed to be coupled to a second component of the device. Here it should be noted that the term "output apparatus" is used to denote apparatus that not only provides an output torque but that also is used to apply input torque to tubular torsion bar 10. Also, in some special applications the mounting and output apparatus could be reversed. Torsional or spring energy is stored in torsion bar 10 by rotating inner tube 12 relative to outer tube 14 that is by rotating output ferrule 26 as illustrated by arrow 28. Also, it will be understood that the torsional or spring energy stored in torsion bar 10 is applied to output ferrule 26.

Material selection for inner tube 12, outer tube 14 and joiner bushing 20 can be manipulated for different applications. In one example, outer tube 14 is made from metal while inner tube 12 is a fiber reinforced composite material. In another example, outer tube 14 is made from a fiber reinforced composite material while inner tube 12 is made of metal. In other examples both inner and outer tubes 12 and 14 can be made from a composite material or from metal. One advantage to using composite materials over metals is that the composite materials are lower density than metals with comparable strength. Therefore, generally more energy can be stored in composite tubes per unit mass than in metals. Also, composite materials are less stiff than metals, which mean a higher angular deflection is possible for the composite tubes compared to metal tubes. However, there is a greater limit on the diameter of composite tubes that can be used. As the diameter of composite tubes is increased, the performance is limited by a critical torsional buckling load, whereas at small diameters torsional buckling is not a concern. As the composite tube diameter increases torsional buckling becomes more likely and the strength of the composite materials cannot be fully utilized. Therefore, depending on the diameter of the tubes and the energy storage requirements for any specific application, either metal or composite material can be used for either or both of inner tube 12 and outer tube 14.

It will be understood that in general the length of inner tube 12 and outer tube 14 depends upon the application. As the length of inner tube 12 and outer tube 14 increases, the amount of energy that can be stored increases. The relationship between length and stored energy is approximately linear e.g., a tube that is twice the length will generally store twice the energy. For maximum energy storage it is desirable to have as much axial envelope or length as possible. However, as the tube length increases the likelihood for buckling increases. Thus, for applications with unlimited axial envelope (i.e. no space limitations), torsional buckling will limit the axial length, otherwise, the available envelope or space will generally limit the length. For purposes of this disclosure inner tube 12 and outer tube 14 will be considered "elongated tubes" regardless of the diameter and length (since the length will generally be greater than the diameter).

There are also manufacturing limitations affecting the selection of materials for inner tube 12 and outer tube 14. All composite materials have a minimum diameter within which they can be wound. Metals have their own limitations based on manufacturability. For example, welded metal tubes do not react to torque very well and machined metal rods are limited by heat treating properties and complex deep bore machining processes.

While metal materials may be used for both inner tube 12 and outer tube 14, metals are generally stiffer than fiber reinforced composites which reduces the energy storage capability. Titanium is one exception within the category of metals. A titanium tube would perform similarly to a composite tube but would be very expensive. On the other hand, fiber reinforced composite materials can be used for both inner tube 12 and outer tube 14. An all-composite construction may be an option for applications where metals cannot be used (for example in MRI systems or in silicon wafer systems).

Other materials may also be used in the fiber-reinforced composite tube. Glass is a good material because it is cheap and easy to manufacture and has low stiffness. Low stiffness is attractive for use in torsion bar 10 because the energy stored within the tubes is characterized by the torque multiplied by the deflection. Low stiffness materials yield higher deflection thus increasing the energy storage within torsion bar 10. Carbon-fiber dominates most fiber-reinforced composite applications but is not the material of choice for torsion bar 10 due to the higher stiffness. There are other materials that seem attractive for use in torsion bar 10. For example, Kevlar would be an excellent fiber material but would be cost prohibitive for most applications. Selection of the proper fiber and matrix material will ultimately depend on the requirements of each individual application.

In accordance with one embodiment, it has been determined that a cost effective design with substantially superior performance (compared to conventional springs) is comprised of a steel outer tube 14 with a fiberglass reinforced composite inner tube 12. As an example in this embodiment, the composite includes glass fibers with a high strain epoxy matrix material. In a specific example using the materials described above and an outside diameter for outer tube 14 of approximately 1.100 inches, torsion bar 10 is able to withstand a torque of 4370 in*lbs with an angular deflection of 59 degrees. The result is approximately 187 ft*lbs of energy absorption. With an efficiency of 80% the torsion bar of this example has an energy output of approximately 150 ft*lbs. This vastly outperforms any conventional mechanical spring. The torque and deflection results stated result from the energy storage capabilities of inner tube 12 and outer tube 14 only.

Another property inherent to torsion bar 10 is the fact that the torque within inner tube 12 and outer tube 14 is equal. Therefore, inner tube 12 and outer tube 14 should be designed to handle the same torque. If one tube is significantly stronger than the other tube then torsion bar 10 will not be optimized. The stronger bar will have unnecessary mass and stiffness both of which reduce the performance. As a consequence thereof, as the wall thickness of the inside tube varies the geometry or wall thickness of the outside tube will also vary because the two geometries are interrelated by the fact that the two tubes must carry the same torque. It is understood that the inside diameter of the inner tube can vary between a maximum number and zero (i.e. a solid bar). As the inside diameter of the inner tube approaches zero the wall thickness approaches the radius of the tube. As the wall thickness of the inside tube increases the wall thickness of the outside tube must increase and/or a higher strength material must be selected for use in the outer tube.

Joiner bushing 20 is used to join inner tube 12 and outer tube 14 at distal end 16. As torsion bar 10 is loaded in torsion, joiner bushing 20 transmits torque between inner tube 12 and outer tube 14. In a preferred embodiment, joiner bushing 20 is bonded to inner tube 12 and outer tube 14 using a high strength epoxy or the like. It should be understood that the joiner bushing material is important to the function of the system. The most important material property used in a selection of the joiner bushing material is the elastic modulus or, more specifically, the torsional modulus since joiner bushing 20 is loaded in torsion. Since joiner bushing 20 is bonded to materials that are deformed under load, it is important that the torsional modulus of joiner bushing 20 is similar to the materials to which it is bonded. If the torsional moduli of the materials which are bonded together are not similar the epoxy in the bondline between the two parts will be placed in high shear and the bondline will fail.

For the example of a torsion bar described above (with a metal outer tube and composite inner tube) it is highly desirable to select a material with a torsional modulus between that of inner tube 12 and outer tube 14. Generally, composite material has a minimum torsional modulus of 1.5 Msi and metal has a maximum torsional modulus of 15 Msi. Thus, preferably the material of joiner bushing 20 should lie in a range of approximately 1.5 Msi to approximately 15 Msi. In the example used, some materials that meet the requirement include (while there are undoubtedly others) aluminum, titanium, and various high modulus reinforced engineering plastics (like fiber reinforced PEEK, glass filled PET, or various filled aromatic polyimides). Other factors may also be used to select the best materials for joiner bushing 20 depending upon the requirements of specific applications (mostly cost and environmental requirements). It will be clear to the artisan that joiner bushing 20 greatly simplifies production of tubular torsion bar 10.

While torsional modulus is discussed above for aiding in the selection of materials for the various components it will be understood that the term "torsional stiffness" is possibly more accurate. Torque balance between the inner tube and the outer tube is one of the important factors to be achieved in the selection of materials, sizes and shapes. In striving for torque balance it must be noted that stiffness is an artifact of the material properties and the necessity for torque balance. It is always desirable that the torsional stiffness of the tubes is low. However, the torsional stiffness is limited by the ability of the joiner bushing to carry the torque. Higher tube deflection makes the job of the joiner bushing much more difficult, especially since the torque reverses between the inner and outer tubes through the joiner bushing.

Figure 2:
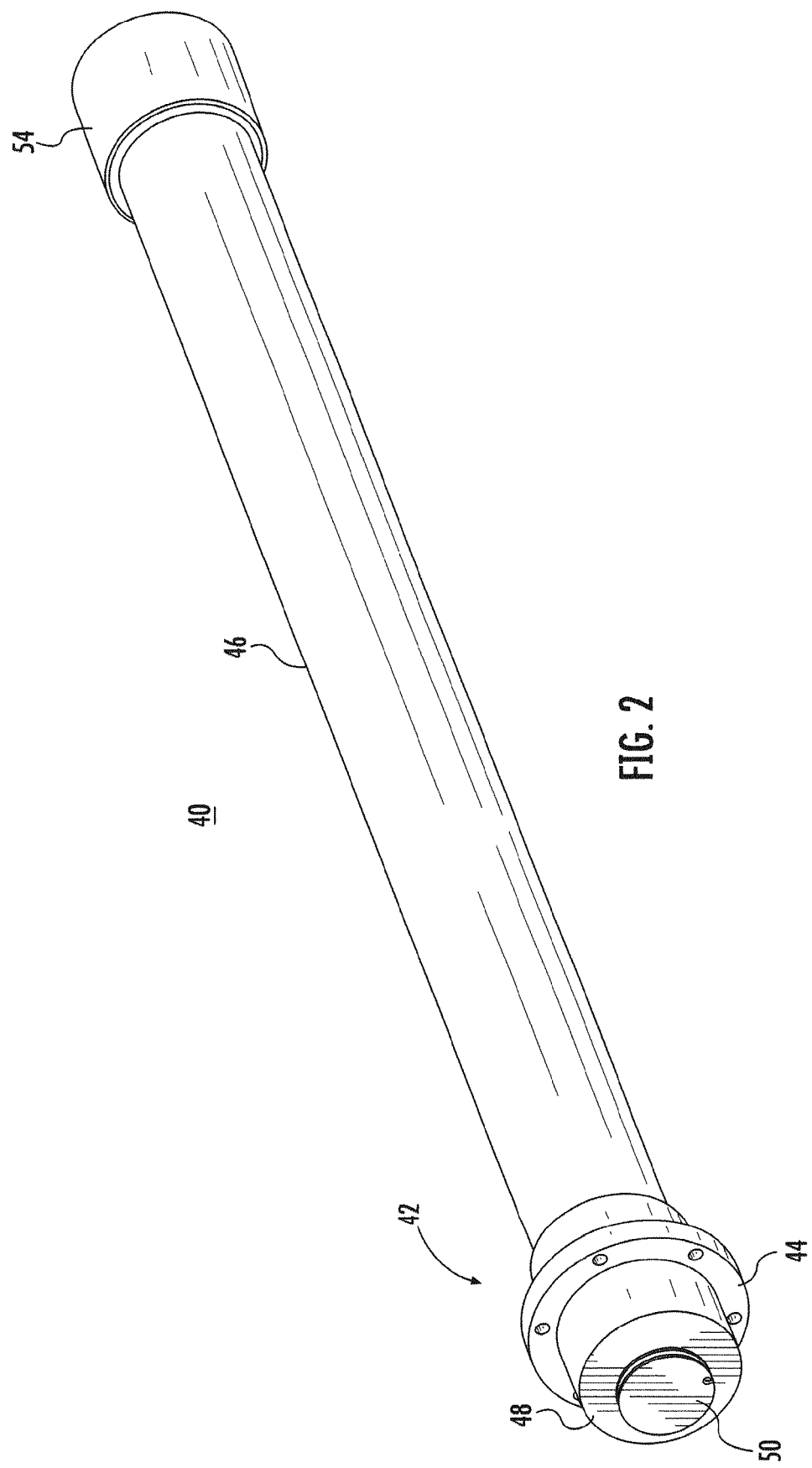
FIG. 2 is a perspective view of a tubular torsion bar in accordance with the present invention, and including an improved mounting and output system.
Figure 3:
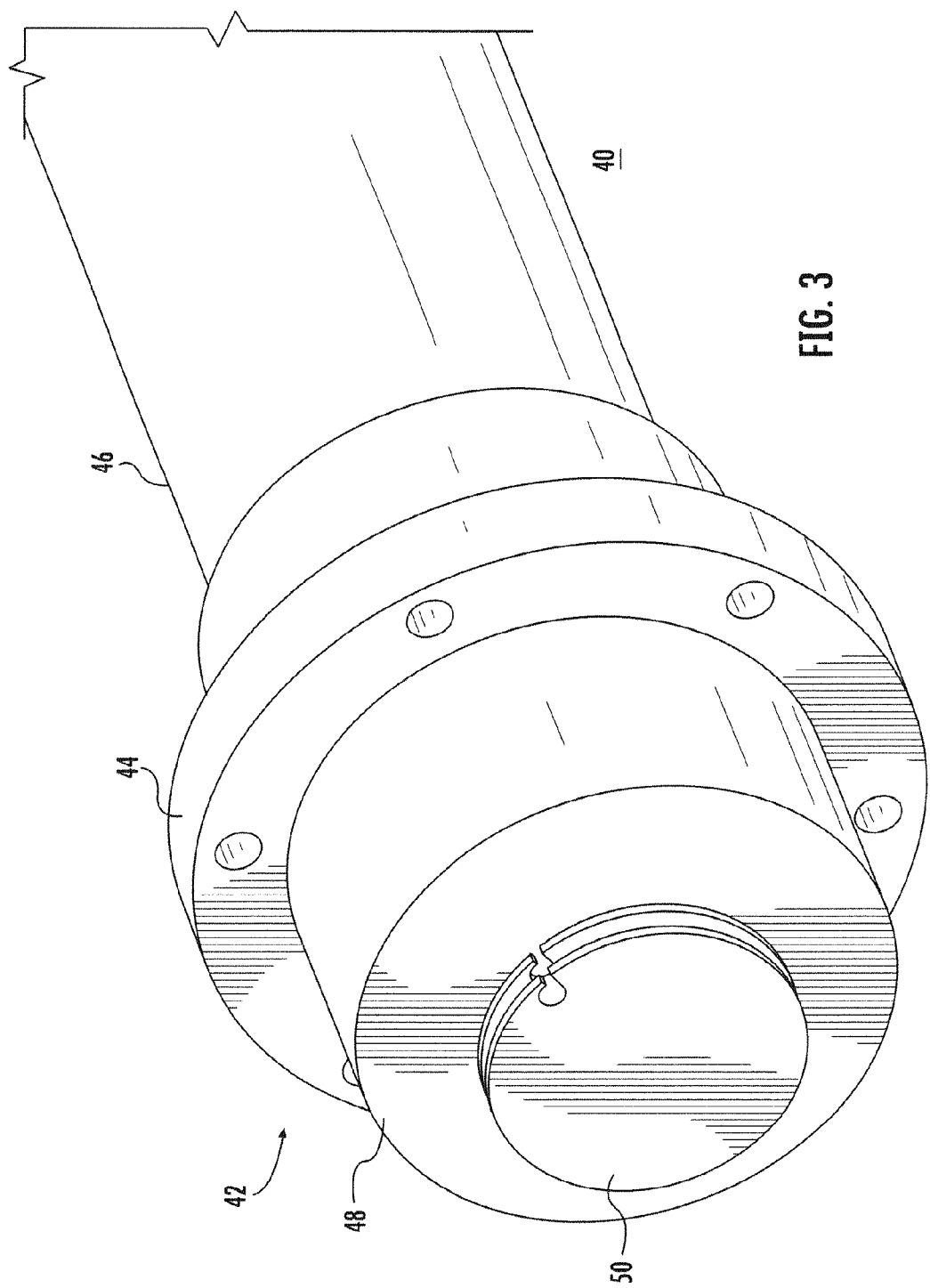
FIG. 3 is an enlarged perspective view of the improved mounting and output system.

Turning now to FIG. 2, a tubular torsion bar 40 is illustrated that includes an improved mounting and output/input (hereinafter output") system generally designated 42. System 42 includes a mounting ferrule 44 shown as a ring extending around and fixedly attached to the outer periphery of outer tube 46. It will of course be understood that mounting ferrule 44 can be formed in virtually any configuration that can be used to fixedly attach outer tube 46 to a device (not shown) requiring some spring action. A housing 48, in this preferred embodiment is formed as a part of mounting ferrule 44 and carries a planetary system described below in more detail. An output apparatus or interface 50 is coupled to the inner tube of torsion bar 40 through the planetary system for rotary movement with the inner tube. Output interface 50 is illustrated as a pulley but can be any component that can be used to couple rotary movement and output energy from/to a component of the device (not shown) requiring some spring action, such as a gear, spline, keyed shaft drive screw, sprocket, or the like.

Figure 4:
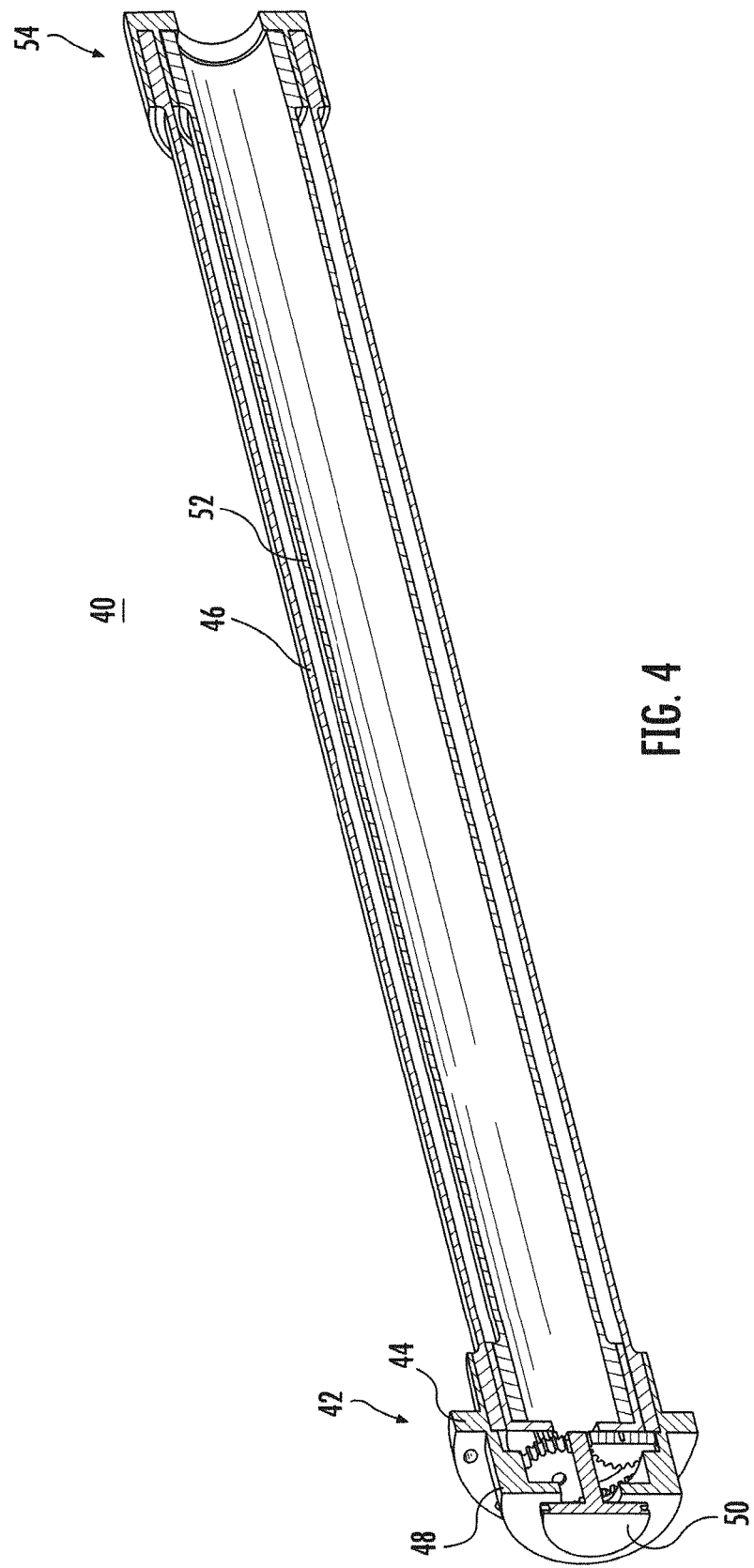
FIG. 4 is a cross-sectional view in perspective of the tubular torsion bar and improved mounting and output system of FIG. 2.

Referring to FIG. 4, a sectional view of torsion bar 40 is illustrated showing outer tube 46, an inner tube 52, the inner components of mounting and output system 42, and a joiner bushing 54. In this example outer tube 46, inner tube 52, and joiner bushing 54 are formed as described above, i.e. a steel outer tube 46 with a fiberglass reinforced composite inner tube 52 and joiner bushing 54 lying in a range of approximately 1.5 Msi to approximately 15 Msi. With additional reference to FIGS. 5 and 7, a planetary gear system 60 can be seen positioned within housing 48. Housing 48 has a tubularly extending annulus or flange 62 that coaxially receives outer tube 46 therein and in fixed engagement therewith. In this example flange 62 is fixedly attached to outer tube 46 by a high-strength epoxy but other materials or methods may be used. A planetary ring gear 64 is formed or fixedly mounted in the inner periphery of housing 48 so as to be positioned coaxial with tubes 46 and 52. Ring gear 64 may be formed directly into the inner periphery of housing 48 or may be a separate component fixedly mounted to the inner periphery so that housing 48 and fixedly attached outer tube 46 rotate with ring gear 64. In this embodiment the proximate end of inner tube 52 is solid or closed to form a radially extending partial wall 68. Three planet gears 66 are rotatably mounted on the proximate end of wall 68 by axles 69 (one each). Planet gears 66 are mounted so as to mesh with ring gear 64 and for rotary movement about axles 69 as ring gear 64 is rotated. A sun gear 70 is mounted along the longitudinal axis of inner tube 52 and is positioned between planet gears 66 so as to mesh with each of the three planet gears 66 and rotate in response to rotation of planet gears 66 or conversely to rotate planet gears 66 in response to rotation of sun gear 70. Sun gear 70 is mounted on or adjacent to one end of an output shaft 72 which extends outwardly through an opening in the proximate end of housing 48. In this example output interface 50 (a pulley) is attached to the outwardly extending end of output shaft 72 for rotation therewith.

Referring additionally to FIG. 6, a bearing 80 is mounted within housing 48 to guide and stabilize output shaft 72. Bearing 80 can be any of a large variety of bearings and bearing materials that mount shaft 72 and, thus, sun gear 70 for easy unhampered rotation.

One setback to torsion bar 10 described above is that the output is limited to 59 degrees of deflection. That is where planetary gear system 60 comes into play. The concentric nesting of tubes 46 and 52 and the torsional deflection is an optimal configuration for a planetary gear system to be used. Planetary gear system 60 is used to alter the torque versus deflection characteristics of torsion bar 40. With ring gear 64 fixedly attached to housing 48 and thus to outer tube 46 and planet gears 66 attached to inner tube 52 a combination of gears can be selected to achieve many different gear ratios within planetary gear system 60. As an example, in the configuration illustrated ring gear 64 has 58 teeth, the three planet gears 66 have 25 teeth each and sun gear 70 has 8 teeth resulting in a gear ratio of 8.25:1. By incorporating planetary gear system 60 with tubes 46 and 52 the maximum torque is now approximately 530 in*lbs with an angular deflection of approximately 487 degrees. It will be understood that the specific planetary gear properties mentioned are only shown and described as an example and many different gear combinations can be used to customize the torque versus deflection characteristics for each individual application. For extremely high gear ratios a multiple stage planetary system could be utilized.

Figure 8:
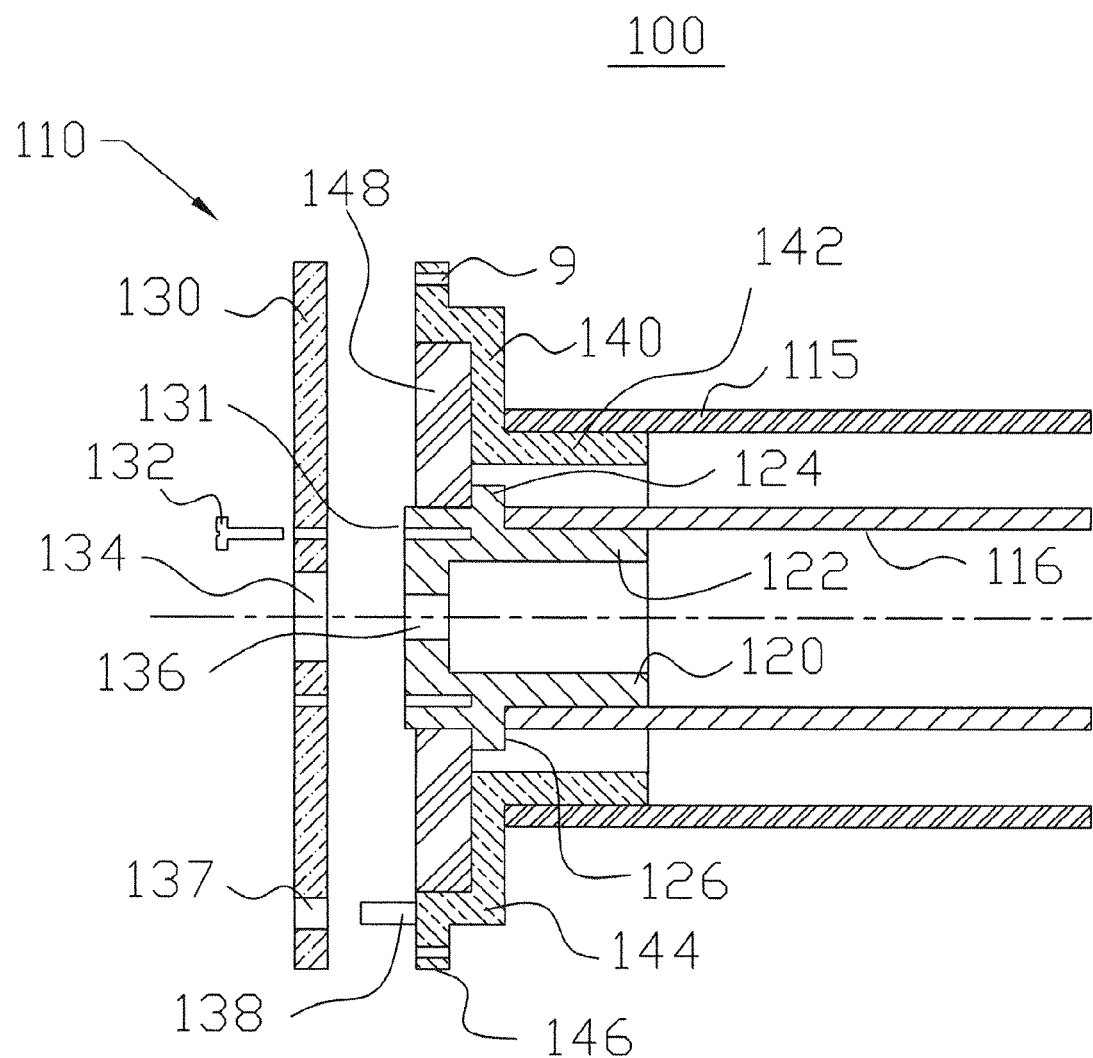
FIG. 8 is an enlarged cross-sectional view of the tubular torsion bar and another improved mounting and output system at the proximate end.
Figure 9:
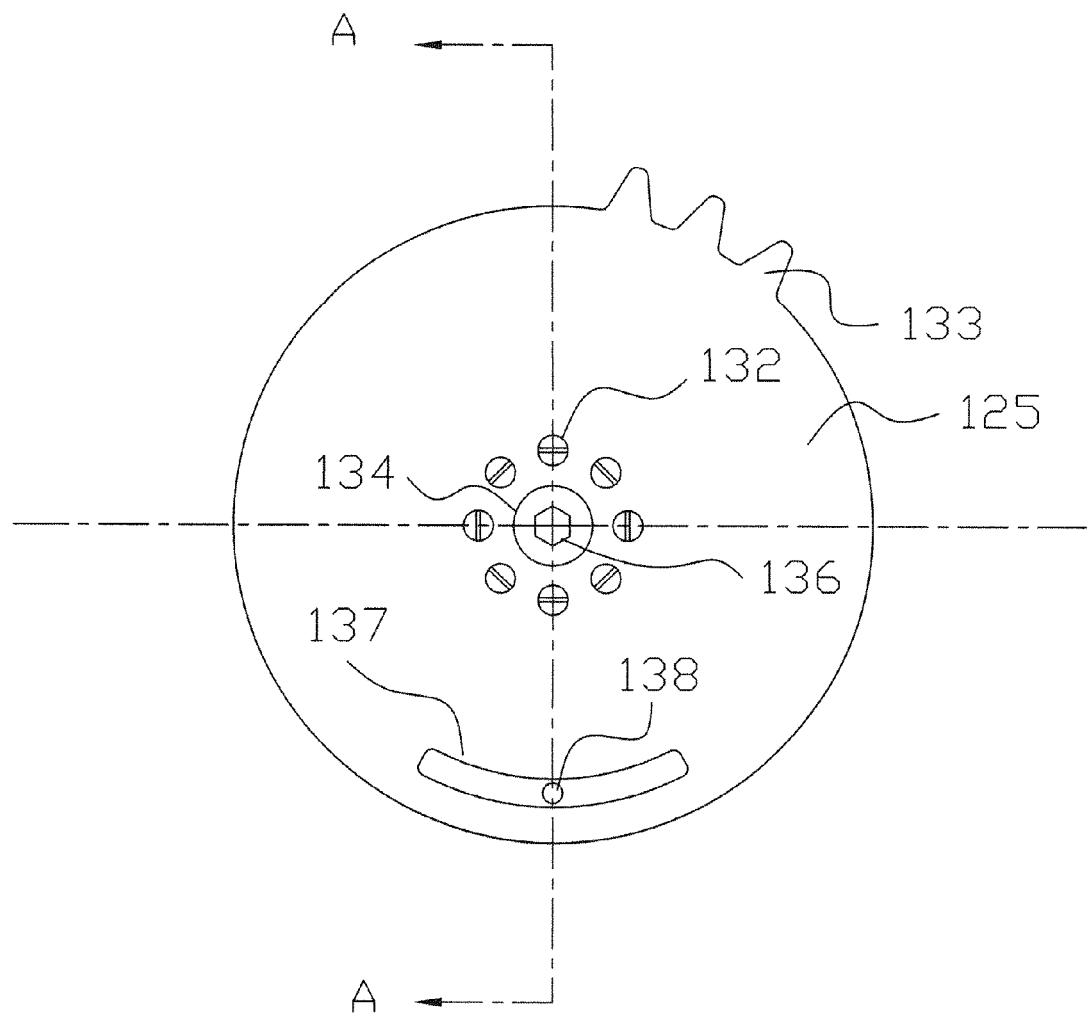
FIG. 9 is an end view of the improved mounting and output system of FIG. 8.

Turning to FIGS. 8 and 9, an enlarged cross-sectional view and an end view, respectively, of a preferred mounting and output system 110 positioned at the proximate end of a tubular torsion bar 100 is illustrated. As explained in more detail above, tubular torsion bar 100 includes an outer elongated tube 115 and an inner elongated tube 116, only the proximate ends of which are illustrated. In this embodiment the output apparatus includes a cup-shaped member 120 with a longitudinally or axially extending sidewall 122 having an outer diameter slightly smaller than the inner diameter of inner tube 116 and designed to fit nestingly therein. A radially outwardly extending flange 124 is positioned to limit the axial movement between inner tube 116 and member 120. Also at least a portion of flange 124 is formed as a positioning rib to fix the radial position of member 120 relative to inner tube 115. In this example sidewall 122 is fixedly attached to inner tube 116 by a high-strength epoxy but other materials or methods may be used.

The proximate end of member 120 is a flat surface which may, for example, have holes 131 provided therein for the attachment of an output adapter 130. In this embodiment output adapter 130 is a disk that may be circular or cylindrical in shape with a center axis that coincides with the central longitudinal axis of tubular torsion bar 100. Output adapter 130 is attached to the proximate end of member 120 by screws 132 inserted into holes 131 or other suitable mechanical devices. The outer circumference of adapter 130 may be provided with some structure for transferring movement to external apparatus, such as gear teeth 133 (see FIG. 9), pulley sheaves or other apparatus to transfer the torsional energy stored in tubular torsion bar 100 to a driven device or devices. A central aperture 134 allows access to engagement with cup-shaped member 120.

Also, an axially aligned engagement structure 136 is provided in the flat surface of member 120. Engagement structure 136 may be used to couple output apparatus 120 to a device used to energize tubular torsion bar 100 and is accessible through central aperture 134. Engagement structure 136 may be, for example a square, octagonal, or triangularly shaped hole or may correspond to any commonly known mechanical fasteners such as Allen. Torx, Bristol, or Phillips heads or other types.

An arcuate slot 137 formed in output adapter 130 is positioned to be coaxial with the longitudinal axis of tubular torsion bar 100. A stop pin 138 extends longitudinally from a surface of mounting apparatus 140 and is slideably engaged in arcuate slot 137. It will be understood that the arcuate slot and stop pin could be reversed with the arcuate slot in mounting apparatus 140 and the stop pin on the output adapter 130. Slot 137 and stop pin 138 are designed and positioned to limit the relative rotation of inner tube 116 with respect to outer tube 115.

Mounting apparatus 140 is formed in the shape of an axially extending ring with an axially or longitudinally extending flange 142 at the inner edge thereof having an outer diameter slightly smaller than the inner diameter of outer tube 115. To mount the proximate end of outer tube 115, flange 142 is positioned coaxially within outer tube 115 and is fixedly attached to outer tube 115 by a high-strength epoxy but other materials or methods may be used.

Mounting apparatus 140 further includes a flange extending circumferentially around the outer edge that includes a portion 144 that extends longitudinally away from outer tube 115 and a radially outwardly extending portion 146. The surface of mounting apparatus 140 directed away from outer tube 115 along with the inner surface of portion 144 and the outer surface of cup-shaped member 120 forms a ring shaped pocket in which an annular element 148 is positioned. Annular element 148 may be any one of, or any combination of, a roller bearing or bushing providing a low friction structure to maintain concentricity at the proximate ends of inner tube 116 and outer tube 115. Also, electro-magnetic apparatus may be included to generate an electrical current pulse or profile as a consequence of the relative rotation of cup-shaped member 120 with respect to mounting apparatus 140. As one example of such electro-magnetic apparatus a coil of current carrying material could be included in annular element 148 with output adapter 130 being constructed at least partially of magnetic material that produces a rotating magnetic field in proximity to the fixed coil and induces an electrical current therein. Also, the annular element 148 can include a viscous or non-viscous damping device to control the rate at which the energy stored in tubular torsion bar 100 is released as it moves from the higher potential energy position to the lower potential energy position.

Figure 10:
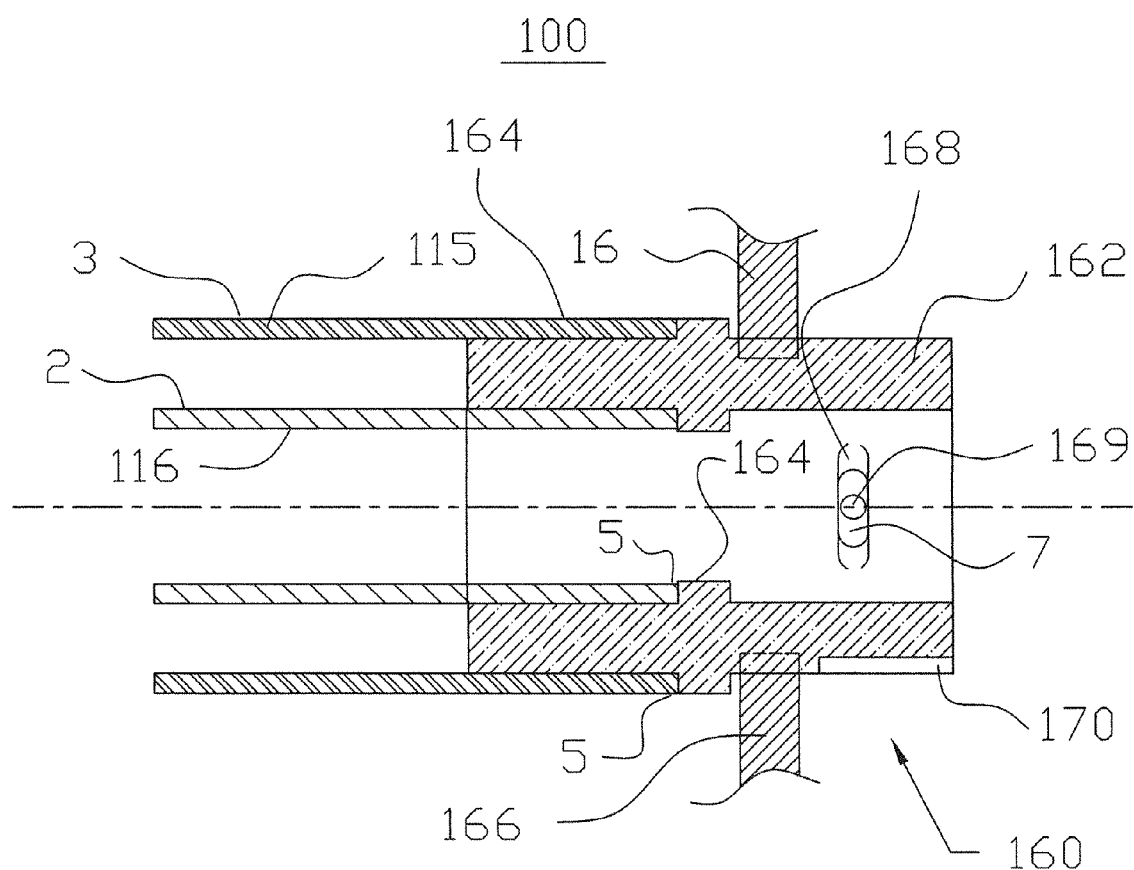
FIG. 10 is an enlarged cross-sectional view of the tubular torsion bar and an improved joiner bushing at the distal end.
Figure 11:
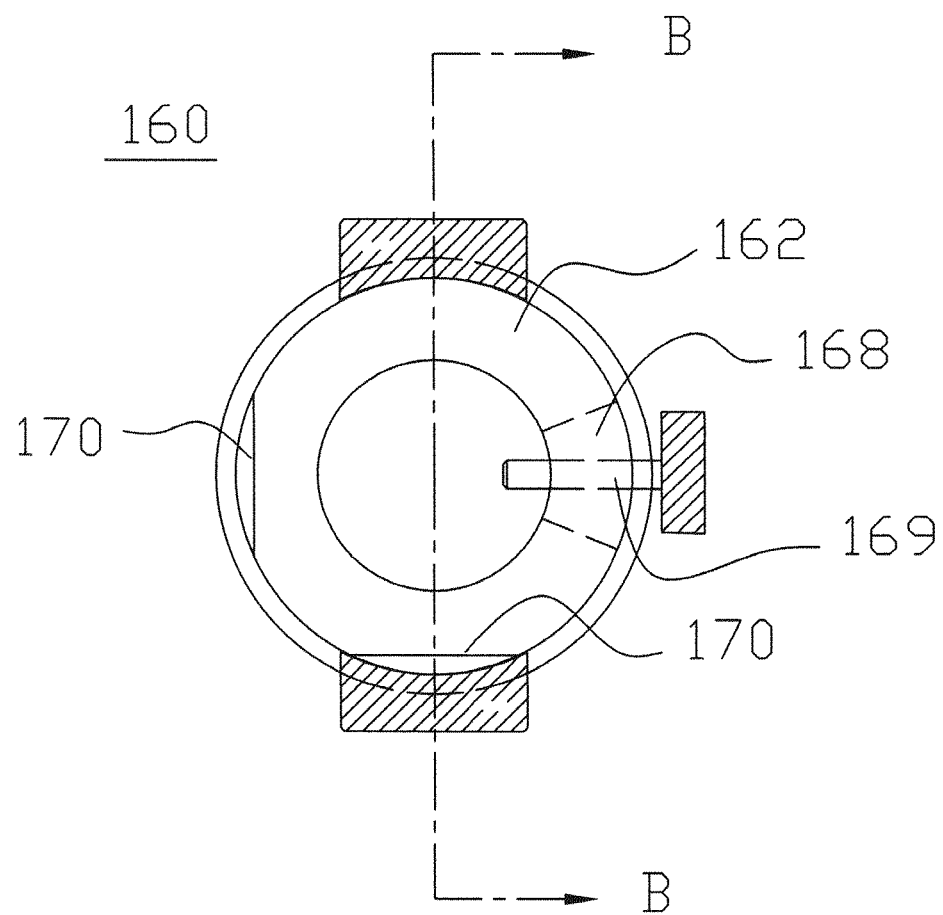
FIG. 11 is an end view of the improved joiner bushing of FIG. 10.

Turning to FIGS. 10 and 11, an enlarged cross-sectional view and an end view, respectively, of a preferred joiner bushing 160 positioned at the distal end of tubular torsion bar 100 is illustrated. In this specific embodiment, joiner bushing 160 includes a cylindrical body 162 with an outside diameter slightly smaller than the inside diameter of outer tube 115 and an inside diameter slightly larger than the outside diameter of inner tube 116. The proximate end of body 162 is positioned between outer tube 115 and inner tube 116 which extend a distance along the surfaces of body 162 (approximately one half in this example) to provide sufficient area for fixing the structure together. Ribs 164 extend radially outwardly and radially inwardly from body 162 to engage and position outer tube 115 and inner tube 116, respectively. Ribs 164 provide exact location for cylindrical body 162 relative to outer tube 115 and inner tube 116. Cylindrical body 162 is positioned coaxially between outer tube 115 and inner tube 116 and is fixedly attached thereto by a high-strength epoxy but other materials or methods may be used.

Body 162 of joiner bushing 160 extends axially outwardly from the distal ends of outer tube 115 and inner tube 116 to allow external support structure 166 to slideably (rotationally) engage the outer surface. External support structure 166 allows rotational movement of body 162 while preventing any lateral or transverse movement so as to maintain the axial alignment of the distal and proximal ends of outer tube 115 and inner tube 116. This relative movement can be achieved in a variety of apparatus including for example bearings or bearing surfaces, etc. Also, an arcuate slot 168 through the side of body 162 is positioned to cooperate with an externally mounted stop pin 169 and limit the rotation of body 162 to a prescribed angular displacement. It will of course be understood that the arcuate slot and stop pin apparatus could be reversed with the stop pin mounted on the body 162 and the arcuate slot formed in external structure. Once body 162 is constrained from further rotational movement, further rotation of the output apparatus is allowed but the rate of energy storage per degree of angular displacement is increased because only inner tube 116 is actively being loaded with torsional energy. Stop pin 169 can be very rigid in which case the change of torsional spring rate is very quick or it may have some compliance to allow for a smoother transition to the higher torsional spring rate.

The extended portion of body 162 also allows for a distal end power take-off from which a portion of the energy stored in tubular torsion bar 100 may be extracted by an attached external device. A large variety of apparatus are possible to connect an external device (not shown) to body 162 including the use of dowel pins, set screws, or mechanical couplers that allow for misalignment between body 162 and the external device. For example, a very simple way to couple an external device is by the use of machined flats 170 on the outer surface of body 162 usually displaced 90 degrees axially from one another over which a hollow shaft of an external device is placed and secured using set screws or the like.

Joiner bushing 160 is also designed to be capable of balancing and/or optimizing bond line stress between inner tube 116 and body 162 and between body 162 and outer tube 115. For the generalized tubular torsion bar the torque carried by each torsion tube is identical because the tubes are coupled in series. However, the maximum shear stresses at the outer surface of the inner and outer tubes are, in general, not equal and can be expresses as:

$$SS_M = T_{app} \times r_{out} / [(pi/32) \times (OD^4 - ID^4)]$$

Where: $SS_M$ is the max shear stress;
$T_{app}$ is the applied torque;
$r_{out}$ is the outer radius of the tube;
OD is the outer diameter; and
ID is the inner diameter.

The strongest bond between body 162 and a torsion tube (inner or outer) is achieved by balancing the maximum shear stress in the torsion tube at the joiner bushing bond line to the maximum shear stress in the joiner bushing at the bond line.

Since the maximum shear stresses in the inner and outer tubes are generally not equal, it follows that the maximum stresses in the joiner bushing at the two bond lines (joiner bushing to inner tube and joiner bushing to outer tube) are also generally not equal. In addition to this radial shear stress gradient at the joiner bushing inner and outer surfaces, there is an axial gradient to the sheer stress at the joiner bushing surface. Both the radial shear stress and the axial shear stress must be matched to that of the corresponding torsion tube in order to achieve the strongest and longest lasting bond between the joiner bushing and the torsion tube.

To achieve these results the new and improved joiner bushing of this invention is constructed of a material capable of carrying the design torsion load with appropriate design safety factors. The specifically designed material exhibits torsional modulus gradients in both the radial and the axial directions so as to allow shear stress matching at the bond line interfaces with the inner and outer torsion tubes. This can be mathematically expressed as:

$$SS_M = G \times r \times theta / l$$

Where: $SS_M$ is the max shear stress;
G is the torsional or shear modulus;
R is the radius of the tube to the bond line;
Theta is the angular deflection along the length of the tube and is measured between the bonded interface at the proximal end and the bonded interface at the distal end; and
L is the length of the torsion tube.

Since r, theta and l are known and determined from the specific application design requirements they are available for the purpose of maximum shear stress balancing. However, the maximum shear stress in the joiner bushing can be varied by changing the value of G, the torsional modulus.

There are many ways in which a continuously variable modulus (G) can be manufactured into the joiner bushing material. Some specific examples of methods and structure to achieve these ends follow:

For polymer based joiner bushings, the polymer can be doped with variable amounts of stiffening material in a manner to generate a continuously variable density of the stiffening additive in each of the axial and radial directions. The resulting non-homogeneous material will exhibit the torsion modulus gradients needed to balance the shear stresses at the bond line interfaces to the torsion tubes and deliver a strong and long lasting bond between the inner and outer torsion tubes.

For metallic joiner bushings that are manufactured by a sintering process, a porosity gradient can be created in each desired direction by doping the metal with a material that is out-gassed during the sintering process.

For joiner bushings that are manufactured from a composite material, the bushing can be constructed on a mandrel whereby radial lengths of stiffening fiber can be wound into the carrier material such that the spacing of the fibers becomes more dense or less dense as the radius of the built-up material increases, depending upon whether the desired result is a higher modulus (G) or a lower modulus at the torsion tube bond line.

In summary, the tubular torsion bar is a spring energy storage system including two concentric tubes and a joiner bushing. Design details like the "torque balance" between the joiner bushing and the inner and outer tubes and proper selection of the joiner bushing material are contributing factors in the operation and efficiency of any selected embodiment. There are also many details on material selection that will yield different results based on cost and performance requirements of different applications. Thus, it can be seen that the tubular torsion bar is a highly specialized device engineered to maximize energy storage potential per unit mass and volume and, in this invention, an improved mounting and output system at the proximate end and an improved joiner bushing at the distal end are disclosed.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A tubular torsion bar comprising:
an elongated inner tube of flexible material having a proximal end and a distal end;
an elongated outer tube of flexible material having a proximal end and a distal end;
a cylindrically shaped joiner bushing fixedly attached to and positioned partially between the distal end of the inner tube and the distal end of the outer tube with the inner tube and outer tube positioned in coaxial and substantially coextensive concentric nesting positions;
the cylindrically shaped joiner bushing includes an elongated cylindrical body, with a portion of the cylindrical body extending coaxially between a portion of inner tube adjacent the distal end of the inner tube and a portion of the outer tube adjacent the distal end of the outer tube, the portion of the cylindrical body and the portion of inner tube define a first bond line and the portion of the cylindrical body and the portion of outer tube define a second bond line;
external apparatus mounting the joiner bushing to maintain axial alignment of the distal and proximal ends of the inner tube and the outer tube and for limited rotational movement; and
a mounting and output system fixedly attached to the proximal ends of the inner tube and the outer tube.

2. A tubular torsion bar as claimed in claim 1 wherein the elongated cylindrical body of the joiner bushing is constructed to match radial shear stress between the portion of the cylindrical body and the portion of inner tube at the first bond line and to match radial shear stress between the portion of the cylindrical body and the portion of outer tube at the second bond line.

3. A tubular torsion bar as claimed in claim 2 wherein the portion of the cylindrical body of the joiner bushing is constructed with a continuously variable torsional modulus in the radial direction.

4. A tubular torsion bar as claimed in claim 1 wherein the elongated cylindrical body of the joiner bushing is constructed to match axial shear stress between the portion of the cylindrical body and the portion of inner tube at the first bond line and to match axial shear stress between the portion of the cylindrical body and the portion of outer tube at the second bond line.

5. A tubular torsion bar as claimed in claim 4 wherein the portion of the cylindrical body of the joiner bushing is constructed with a continuously variable torsional modulus in the axial direction.

6. A tubular torsion bar as claimed in claim 1 wherein the elongated cylindrical body of the joiner bushing is constructed to match radial shear stress between the portion of the cylindrical body and the portion of inner tube at the first bond line and to match radial shear stress between the portion of the cylindrical body and the portion of outer tube at the second bond line, and the elongated cylindrical body of the joiner bushing is constructed to match axial shear stress between the portion of the cylindrical body and the portion of inner tube at the first bond line and to match axial shear stress between the portion of the cylindrical body and the portion of outer tube at the second bond line.

7. A tubular torsion bar as claimed in claim 6 wherein the portion of the cylindrical body of the joiner bushing is constructed with a continuously variable torsional modulus in the radial direction and with a continuously variable torsional modulus in the axial direction.

8. A tubular torsion bar as claimed in claim 1 wherein the cylindrical body of the joiner bushing includes an arcuate slot and stop pin apparatus limiting the rotation of the joiner bushing to a selected angular movement.

9. A tubular torsion bar comprising:
an elongated inner tube of flexible material having a proximal end and a distal end;
an elongated outer tube of flexible material having a proximal end and a distal end;
a cylindrically shaped joiner bushing including a cylindrical body, the cylindrically shaped joiner bushing fixedly attached to and positioned partially between the distal end of the inner tube and the distal end of the outer tube with the inner tube and outer tube positioned in coaxial and substantially coextensive concentric nesting positions;
external apparatus mounting the joiner bushing to maintain axial alignment of the distal and proximal ends of the inner tube and the outer tube and for limited rotational movement;
a mounting and output system fixedly attached to the proximal ends of the inner tube and the outer tube; and
the cylindrical body of the joiner bushing includes a distal end power take-off for extracting a portion of energy stored in the tubular torsion bar.

10. A tubular torsion bar comprising:
an elongated inner tube of flexible material having a proximal end and a distal end;
an elongated outer tube of flexible material having a proximal end and a distal end;
a cylindrically shaped joiner bushing fixedly attached to and positioned partially between the distal end of the inner tube and the distal end of the outer tube with the inner tube and outer tube positioned in coaxial and substantially coextensive concentric nesting positions;
external apparatus mounting the joiner bushing to maintain axial alignment of the distal and proximal ends of the inner tube and the outer tube and for limited rotational movement; and
a mounting and output system fixedly attached to the proximal ends of the inner tube and the outer tube, the mounting and output system includes mounting apparatus affixed to the outer tube and output apparatus affixed to the inner tube with an annular element positioned between the mounting apparatus and the output apparatus to rotatably position the inner tube and the outer tube in coaxial and substantially coextensive concentric nesting positions.

11. A tubular torsion bar as claimed in claim 10 wherein the mounting apparatus includes a ring shaped member having an axially extending flange attached to the inner surface of the outer tube and a radially extending flange designed to be affixed to an exterior support.

12. A tubular torsion bar as claimed in claim 10 wherein the output apparatus includes a cup shaped member with longitudinally extending side walls affixed to the inner surface of the inner tube and an end face with an axially aligned engagement structure.

13. A tubular torsion bar as claimed in claim 10 wherein the output apparatus includes a cup shaped member with an end face and an output adapter affixed to the end face, the output adapter including structure transferring movement to external apparatus.

14. A tubular torsion bar as claimed in claim 13 wherein the output adapter includes arcuate slot and stop pin structure positioned to limit the relative rotation of the inner tube with respect to the outer tube.

15. A tubular torsion bar as claimed in claim 1 wherein the inner tube is formed of material having a first torsional stiffness and the outer tube is formed of material having a second torsional stiffness, and the first torsional stiffness and the second torsional stiffness are one of substantially the same and the second torsional stiffness being greater than the first torsional stiffness.

16. A tubular torsion bar as claimed in claim 1 wherein the inner tube and the outer tube are each formed of one of composite material and metal.

17. A tubular torsion bar comprising:
an elongated inner tube of flexible material having a proximal end and a distal end;
an elongated outer tube of flexible material having a proximal end and a distal end;
a cylindrically shaped joiner bushing fixedly attached to and positioned partially between the distal end of the inner tube and the distal end of the outer tube with the inner tube and outer tube positioned in coaxial and substantially coextensive concentric nesting positions, the joiner bushing including a distal end power take-off for extracting a portion of energy stored in the tubular torsion bar;
external apparatus mounting the joiner bushing to maintain axial alignment of the distal and proximal ends of the inner tube and the outer tube and for limited rotational movement; and
a mounting and output system fixedly attached to the proximal ends of the inner tube and the outer tube, the mounting and output system including mounting apparatus affixed to the outer tube and output apparatus affixed to the inner tube with an annular element positioned between the mounting apparatus and the output apparatus to rotatably position the inner tube and the outer tube in coaxial and substantially coextensive concentric nesting positions.

18. A tubular torsion bar comprising:

an elongated inner tube of flexible material having a proximal end and a distal end;

an elongated outer tube of flexible material having a proximal end and a distal end;

a cylindrically shaped joiner bushing fixedly attached to the distal end of the inner tube and the distal end of the outer tube with the inner tube and outer tube positioned in coaxial and substantially coextensive concentric nesting positions, the cylindrically shaped joiner bushing including an elongated cylindrical body, with a portion of the cylindrical body extending coaxially between a portion of inner tube adjacent the distal end of the inner tube and a portion of the outer tube adjacent the distal end of the outer tube, the portion of the cylindrical body and the portion of inner tube define a first bond line and the portion of the cylindrical body and the portion of outer tube define a second bond line, the elongated cylindrical body of the joiner bushing being constructed to match shear stress between the portion of the cylindrical body and the portion of inner tube at the first bond line and to match shear stress between the portion of the cylindrical body and the portion of outer tube at the second bond line;

external apparatus mounting the joiner bushing to maintain axial alignment of the distal and proximal ends of the inner tube and the outer tube and for limited rotational movement; and a mounting and output system fixedly attached to the proximal ends of the inner tube and the outer tube, the mounting and output system including mounting apparatus affixed to the outer tube and output apparatus affixed to the inner tube with an annular element positioned between the mounting apparatus and the output apparatus to rotatably position the inner tube and the outer tube in coaxial and substantially coextensive concentric nesting positions.

\* \* \* \* \*